April 20, 1937.  C. C. LENARTH  2,077,571
PUMP PACKING
Filed Dec. 16, 1935
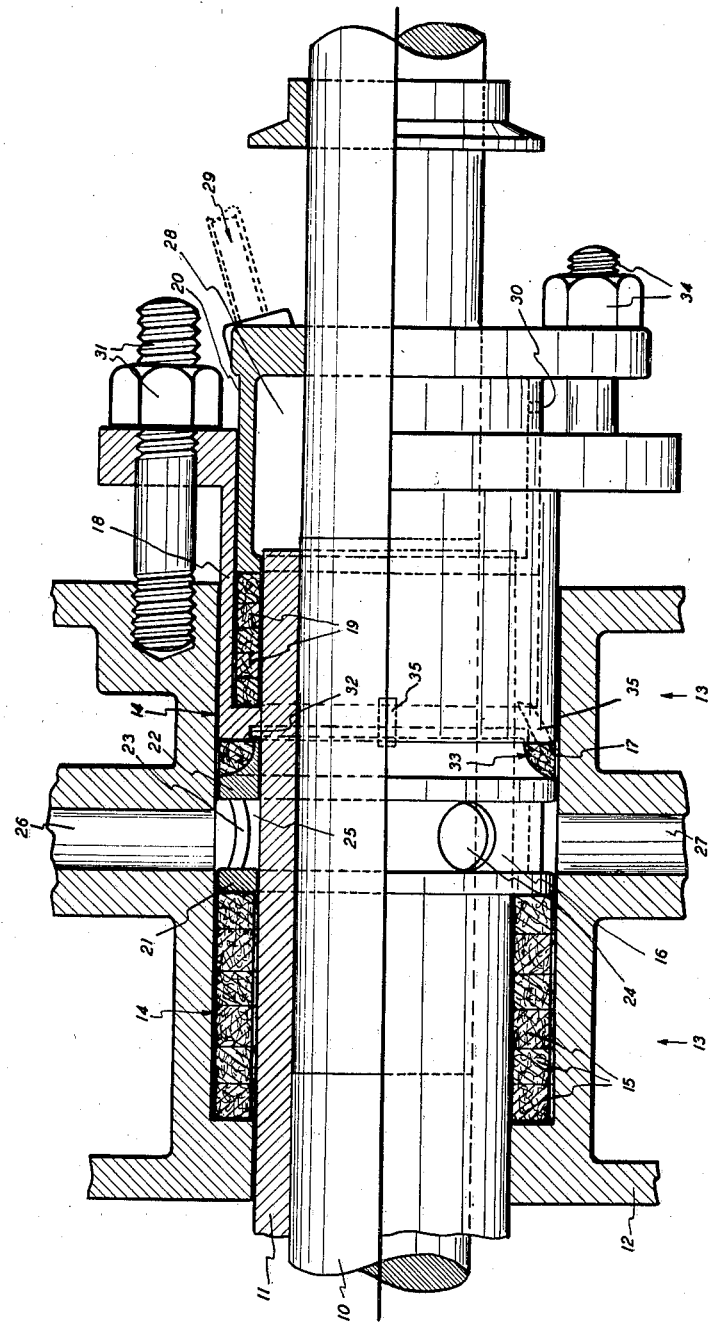
CLARENCE C. LENARTH
INVENTOR
Paul W. Pringman
ATTORNEY Patented Apr. 20, 1937

2,077,571

UNITED STATES PATENT OFFICE 2,077,571

PUMP PACKING

Clarence C. Lenarth, Gardena, Calif.

Application December 16, 1935, Serial No. 54,549

3 Claims. (Cl. 286—19)

The object of my invention is to provide a tight and durable packing for pump shafts or rods or for the stems of valves and is designed to care for high pressures and for temperatures either far above or far below atmospheric.

The invention will best be understood with reference to the attached drawing, which represents an illustrative form of the packing member applied to the shaft of a centrifugal pump, the representation being partly in elevation and partly in longitudinal section.

Referring to the drawing, 10 is the pump shaft and 11 a hard metal sleeve or casing firmly attached to and revolving with the shaft. A portion of the pump case is shown at 12, which may also be taken to represent a portion of a flange to be bolted to the pump case. From this member the stuffing box generally indicated at 13—13 projects around the shaft and is bored to uniform diameter as at 14—14 to receive the packing elements to be described.

The packing elements are, in order from left to right: a plurality of rings 15 of compressible packing placed in the inner end of the stuffing box around sleeve 11; a lantern ring 16; a ring of quarter-round packing 17; a hollow gland 18; a plurality of rings 19 of compressible packing within the hollow gland, and an outer gland 20.

The lantern ring 16 consists of two narrow metal rings 21 and 22 spaced by a bridge 23 which is provided with ports 24 for the passage of a cooling and/or lubricating liquid into the annular channel 25 surrounding the shaft. Side channels 26 and 27 are arranged in the wall of the stuffing box to provide for the circulation of this liquid.

The outer gland 20 is spaced from the shaft for a portion of its length to form a circumferential pocket 28 for a cooling liquid, this liquid being introduced through a pipe connection 29 and withdrawn in any convenient manner, as through a plurality of bleed holes 30.

The packing rings 15 are held in position by the lantern ring 16 by which they are compressed to a running fit around sleeve 11. The lantern ring in turn is held in position by the hollow gland 18 which is forced inwardly by a plurality of bolts and nuts 31. The projecting end 32 of this gland bears against the flat face of quarter-round packing 17 which rests on the curved seat 33 on the outer end of the lantern ring. The pressure of the hollow gland against this packing ring not only forces the lantern ring against packing rings 15 but also expands packing ring 17 into tight engagement with the bore 14 of the stuffing box, thus positively preventing leakage outside the packing from channel 25.

The outer gland 20 bears directly against packing rings 19 and places them in compression when the gland is drawn inwardly by a plurality of bolts and nuts 34.

The hollow gland may be split lengthwise for ease of assembling, and if so formed, it is desirable to dovetail the straight sides of the segments for increased stiffness. To prevent leakage through these joints I provide each with an insert 35 of compressible packing so arranged that its ends bear respectively against packing rings 17 and 19.

The advantages of the packing assembly above described may be illustrated in connection with its use in pumping hot petroleum residuum under high pressure. In an actual application the temperature of the oil is about 650° Fahr. and the pressure within the pump case around the shaft is about 300 pounds per square inch. An oil of the same general character as that being pumped is passed through channels 26, 25, and 27 at atmospheric temperature and under a pressure of about 50 pounds. The compression pressure on packing rings 15 is so adjusted by means of nuts 31 that there is a slight leakage of oil between rings 15 and sleeves 11, thus lubricating the sleeve at this point. The leakage joins the oil circulating through the lantern ring and is thus carried away.

Channel 28 within the outer gland is supplied with a stream of cold water at substantially atmospheric pressure. Because of the low pressure (fifty pounds) which packing rings 19 have to carry the compression pressure on these rings may be so adjusted by means of nuts 34 as to substantially prevent leakage from channel 25 into channel 28 without placing any undue pressure on the sleeve, friction between this packing and the sleeve is reduced to the minimum, and the outer end of the stuffing box is kept substantially cold.

This device differs from prior art packing assemblies using lantern rings in that the pressure on the packing ring 15 which is between the lantern ring and the case is adjusted independently of the pressure on the packing ring 19 which is above or outside the lantern ring. Thus the outer packing ring, which has to seal only a relatively cold oil under relatively low pressure may be kept slack and frictional heating avoided, while the inner packing ring, which carries the maximum pressure and temperature, may be adjusted to just that degree of tightness which gives the most favorable balance between leakage and frictional heat.

The packing assembly described may also be used to advantage in pumping very cold liquids such as the propane reflux to a stabilizing tower. In such use a stream of the charging stock on its way to the tower may be passed through the lantern ring, preventing any leakage of propane to the atmosphere. The freezing of the shaft into the packing which often occurs when such leakage is permitted is thus avoided and the box kept at a constant temperature.

While the assembly is illustrated only as applied to a rotating pump shaft, it will be evident that it may also be applied to reciprocating pump rods or to the stems of valves controlling liquids under extremes of temperature or pressure.

I claim as my invention:

1. A rod packing assembly comprising: a stuffing box surrounding said rod; a first ring of compressible packing surrounding said rod at the inner end of said box; a lantern ring bearing on said first packing ring; channels in said box arranged for the passage of fluid through said ring; a rigid ring projected from the outer end of said lantern ring, adjacent said rod and spaced from said box, said projected ring forming a seat for a second ring of packing and preventing contact between said second packing ring and said rod; a second ring of compressible packing arranged in said seat; a hollow gland bearing on said packing ring; means for adjustably forcing said gland to compress said first and second packing rings; a third ring of compressible packing surrounding said rod within said hollow gland and bearing on said rod; an outer gland bearing on said third packing ring, and means for adjustably forcing said outer gland inwardly to compress said third packing ring.

2. In a rod packing assembly comprising two rings of compressible packing surrounding said rod within a stuffing box and a lantern ring separating said packing rings: a rigid projection from the end of said lantern ring surrounding said rod and spaced from said box, said projection forming a seat for one of said packing rings and preventing contact between said packing ring and said rod, and means for applying pressure to last said packing ring to force said packing into nonleaking engagement with said lantern ring and the bore of said box.

3. In a rod packing assembly including a stuffing box, a first ring of flexible packing in the bottom of said box and a lantern ring bearing on said first packing ring, the improvement comprising: a second ring of flexible packing carried on the outer end of said lantern ring; a rigid ring projected from said lantern ring and interposed between said second packing ring and said rod to prevent contact of said second packing ring with said rod; a gland arranged to compress said second packing ring between said projected ring and the wall of said stuffing box, and a third ring of flexible packing arranged within said gland and bearing on said rod.

CLARENCE C. LENARTH.